(12) United States Patent
Limousin et al.

(10) Patent No.: US 12,391,450 B2
(45) Date of Patent: Aug. 19, 2025

(54) PACKAGE COMPRISING MEANS OF RETAINING AN OBJECT

(71) Applicant: PA.COTTE SA, Pully (CH)

(72) Inventors: Damien Limousin, Saint Etienne de Montluc (FR); Denis Mourrain, Vertou (FR)

(73) Assignee: PA.COTTE SA, Pully (CH)

(*) Notice: Subject to any disclaimer, the term of this patent is extended or adjusted under 35 U.S.C. 154(b) by 25 days.

(21) Appl. No.: 17/779,701

(22) PCT Filed: Nov. 19, 2020

(86) PCT No.: PCT/EP2020/082779
§ 371 (c)(1),
(2) Date: May 25, 2022

(87) PCT Pub. No.: WO2021/105004
PCT Pub. Date: Jun. 3, 2021

(65) Prior Publication Data
US 2023/0002138 A1    Jan. 5, 2023

(30) Foreign Application Priority Data
Nov. 29, 2019 (FR) ...................................... 1913469

(51) Int. Cl.
*B65D 81/05* (2006.01)
*B65D 6/18* (2006.01)

(52) U.S. Cl.
CPC .......... *B65D 81/05* (2013.01); *B65D 11/1833* (2013.01)

(58) Field of Classification Search
CPC .... B65D 81/05; B65D 11/1833; B65D 81/07; B65D 83/0817; B65D 25/102; A47K 10/422

(Continued)

(56) References Cited

U.S. PATENT DOCUMENTS

| 1,632,270 A | 6/1927 | Bradley |
| 4,032,103 A * | 6/1977 | Ehrichs .................... A47B 9/16 |
| | | 248/421 |

(Continued)

FOREIGN PATENT DOCUMENTS

| CN | 101032974 | 9/2007 |
| CN | 110419860 | 11/2019 |

(Continued)

OTHER PUBLICATIONS

English translation of the Written Opinion issued by the International Searching Authority, dated Jan. 28, 2021, for International Patent Application No. PCT/EP2020/082779; 7 pages.

(Continued)

*Primary Examiner* — Steven A. Reynolds
(74) *Attorney, Agent, or Firm* — Faegre Drinker Biddle & Reath LLP

(57) ABSTRACT

A package for transporting an object (O) comprising:
  a box having a stowage volume defined by a bottom and a peripheral rim substantially perpendicular to the bottom;
  a lid able to occupy a position closing the box;
  a tray housed in the stowage volume; and
  means for returning the tray to an operating position in which it is separated from the bottom and holds the object (O) against the lid.
The return means comprise:
  a cross-brace, and;
  a return member secured to the cross-brace and tending to position the cross-brace in a deployed position in which is pushes back the tray with respect to the bottom.

8 Claims, 5 Drawing Sheets

(58) Field of Classification Search
USPC .......... 206/521, 804, 817, 583, 494; 221/52
See application file for complete search history.

(56) References Cited

U.S. PATENT DOCUMENTS

| | | | | |
|---|---|---|---|---|
| 4,981,215 | A * | 1/1991 | Ilic | B60P 7/135 |
| | | | | 206/521 |
| 5,197,631 | A * | 3/1993 | Mishima | B65D 83/0817 |
| | | | | 221/56 |
| 6,015,045 | A * | 1/2000 | Joseph | A61F 15/001 |
| | | | | 206/812 |
| 6,550,636 | B2 * | 4/2003 | Simpson | A47K 10/422 |
| | | | | 221/56 |
| 6,578,732 | B1 * | 6/2003 | Mabry | A47F 1/04 |
| | | | | 221/60 |
| 7,246,784 | B1 * | 7/2007 | Lopez | A47B 51/00 |
| | | | | 248/188.7 |
| 8,186,541 | B2 * | 5/2012 | Szymonski | B65D 83/0835 |
| | | | | 221/33 |
| 2003/0052034 | A1 * | 3/2003 | Bredahl | B65D 75/5838 |
| | | | | 206/233 |
| 2007/0029218 | A1 * | 2/2007 | Picot | A45C 13/02 |
| | | | | 206/521 |
| 2016/0278515 | A1 | 9/2016 | Ergun | |

FOREIGN PATENT DOCUMENTS

| | | |
|---|---|---|
| JP | S57101744 | 6/1982 |
| JP | 03-081534 U | 8/1991 |
| JP | 2002-223981 A | 8/2002 |

OTHER PUBLICATIONS

International Search Report and Written Opinion as issued by the International Searching Authority, dated Jan. 28, 2021, for International Patent Application No. PCT/EP2020/082779; 12 pages.

English translation of International Search Report as issued by the International Searching Authority, dated Jan. 28, 2021, for International Patent Application No. PCT/EP2020/082779; 2 pages.

* cited by examiner

PACKAGE COMPRISING MEANS OF RETAINING AN OBJECT

CROSS-REFERENCE TO RELATED APPLICATIONS

The present application is a national stage entry of International (PCT) Patent Application Number PCT/EP2020/082779, filed Nov. 19, 2020, which claims priority to French Patent Application Number 1913469, filed Nov. 29, 2019, the complete disclosures of which are expressly incorporated herein by reference.

The field of the invention is that of logistics.

More precisely, the invention relates to a package or logistical shipping means, i.e. a container for dispatching objects between two destinations by means of a package.

Packages such as boxes or cartons are known for securely transporting an object in a very safe manner.

Generally, the packages comprise a box having a bottom and a peripheral rim which define together a stowage volume in which is housed the object to be transported.

The packages also comprise a lid that is movable with respect to the box. These lids can in particular assume a closed position in which the lid blocks the stowage volume of the box.

In order to allow the protection of the objects transported, certain packages comprise means for retaining the object to be transported in the box.

Known are retention means which take the form of foam panels integrated into the box and the lid. The foam panels can, if necessary, be applied to the box. In other words, the foam panels can be integrated into the box only if their presence is required.

More precisely, the foam panels are integrated into the bottom of the box, possibly into its peripheral rim, and into the lid.

The object to be transported is then inserted into the stowage volume so as to come into contact with the foam and to be blocked at a minimum by the foam of the bottom and the foam of the lid.

This type of retaining means presents, as a major disadvantage, its thickness, or in other words the bulk that it occupies in the stowage volume of the box, and the management of the waste of this type of single-use product.

IN fact, the foam takes up a major part of the stowage volume of the box. However, the foam has elastic characteristics to as to form deformable retention means to effectively mold itself to the contour of the object to be transported, and thus chock it.

However, depending on the size of the object, several packages must be provided for.

The same box cannot be used, for example, for a voluminous object and for an object of small size.

In the case of the object of small size, if a box or a package appropriate for an object of large size is used, the foam is not suitably deformed in contact with the object of small size, and the latter can then move within the stowage volume of the box, risking damage.

On the contrary, if an object of large size is introduced into the stowage volume of a box intended to contain an object of small size, the package can become unusable for lack of sufficient space in the stowage volume, the lid then not being able to be closed correctly so as to actually block the stowage volume of the box. The result is then that the object is not actually protected. It is, in addition, visible by any person transporting the package, which can lead to the risk of the object being stolen.

Transporters or packaging professionals must consequently possess packages of different sizes depending on the size of the objects to be transported.

Moreover, the presence of the foam makes the package bulky when it is not in use, even if the package is foldable to bring it into a "flattened" stowage or storage condition.

In fact, folding the package allows optimizing its bulk when it is not in use. However, the compression of the foam during the folding of the device can harm the effectiveness of the foam for protecting the object to be transported. When the foam is compressed, it loses its elasticity and may not expand correctly upon decompression; this is all the more true if the duration of the compression of the foam is great.

To avoid this loss of elasticity, it is therefore necessary to avoid too great a compression of the foam, which allows only a partial reduction of the bulk of the package when it is not used.

The storage of the packages, either in the operating configuration or partly folded, or dissociated, therefore necessitates having large-sized premises. In fact, the foam is separated from the box, this for the different sizes of package. This therefore represents a high storage cost which is generally charged to the final consumer.

According to another known technique, the retaining means appear in the form of a plastic envelope within which the object to be transported is slid; the envelope is then deformed so that its walls come into contact with the object to be transported and hold it in its position.

According to a first type, the envelopes can be integrated on the bottom of the box and their deformation can be accomplished for example by heating so as to shrink the material so that it stiffens in contact with the object.

One disadvantage of this solution resides in the fact that the deformation of the envelope, when it is accomplished by heating, cannot be accomplished by everyone because this technique involves the use of specific heating equipment.

In fact, heating means, such as thermal heaters for example, must be used and may need special training so that only professionals can deform the envelope.

Moreover, when the envelope is secured to the bottom of the box, this can be a major disadvantage for the integrity of the box, particularly if it is a carton, too high a heat being able to destroy the carton by burning it.

Moreover, the introduction of the object to be transported into the envelope can prove to be difficult or impossible (depending on the respective dimensions of the object and of the envelope).

This is particularly verified if the object to be transported is inserted into the envelope once the box is formed, i.e. the stowage volume is defined, the peripheral rim of the box presenting in particular a major obstacle to the insertion of the object into the envelope.

To mitigate this, it may be necessary to, first, insert the object into the envelope, then form the box and finally deform the envelope.

This represents a long handling time which can be detrimental for professionals and also be impossible to carry out for individuals, particularly for deforming the envelope or forming the box.

According to a second type, the envelope can also be secured with a tray intended to be housed in the box. In this case, the object is introduced into the envelope, then, in order to secure and retain the object, the envelope is deformed by folding the edges of the tray so as to stretch the two walls of the envelope to imprison the object. Once this is completed, the folded tray can be inserted into the box, then the lid can be closed over the box.

These retaining means also have certain disadvantages.

In fact, the insertion of the object into the envelope poses no problems, but the deformation of the tray, particularly the folding of its edges represents a complicated manipulation, or even impossible to carry out when the object is voluminous and the envelope to be deformed offers a high resistance to deformation. The deformation of the envelope can then become a time-waster and repel the professionals who will then carry out a partial deformation or even propose a package of greater sized, generating an increase in the cost of transportation for the final consumer.

In addition, this requires the simultaneous storage of the box, of the lid and of the retention means, which represents a detrimental total bulk and therefore a supplementary cost which is often passed on to the final client.

To respond to these disadvantages, means for pulling the tray toward the lid have been designed.

These pulling means comprise in particular elastics secured to the tray, on which the user pulls to move the tray closer to the lid and thus block the object to be transported between the tray and the lid.

When the object is blocked, the fastening means are then used to retain the pulling force initiated by the user and thus free the latter.

These fastening means appear in the form of a hook intended to retain the elastics with respect to one another.

If this solution contributes good retention of the object in the package, it can however still be improved.

In fact, these retention means require an effort from the user, who must at the same time accomplish traction and then maintain the initiated traction to use the fastening means.

It then happens that the user can lose the advantage of the initiated traction during the handling of the fastening means.

The invention has in particular the object of mitigating the disadvantages of the prior art.

More precisely, the invention has as its object to propose a solution for automatic retention of an object to be transported inside a package.

The invention also has as its object to supply a solution of this type which is simple to implement and does not require particular handling for a user.

The invention also has as its object to supply a solution of this type that lasts over time.

These objects, as well as others which will appear hereafter, are achieved due to the invention which has as its object a package for transporting an object comprising:
  a box having a stowage volume defined by a bottom and a peripheral rim substantially perpendicular to the bottom;
  a lid able to occupy a position closing the box;
  a tray housed in the stowage volume and movable with respect to the bottom between a rest position in which it is located in proximity to the bottom and an operating position in which it is separated from the bottom and holds the object against the lid;
  means for returning the tray to its operating position,
characterized in that the return means comprise:
  a cross-brace movable between a flattened position in which it is crushed between the tray and the bottom, and a deployed position in which it pushes back the tray with respect to the bottom;
  a return member secured to the cross-brace and tending to position the cross-brace in its deployed position from its flattened position.

The cross-brace and the return member allow pushing back the tray automatically toward its operating position.

The object positioned on the tray is then held between the lid and the tray when the lid closes the stowage volume.

Thus the object can be dispatched without the risk of being damaged during transportation and being able to strike the peripheral rim of the box when the latter is vigorously handled.

Moreover, the chocking of the object in the box requires no effort from the user because it is the return member which provides the blocking of the object between the tray and the lid, beginning with the instant that the lid is in its position closing the stowage volume.

According to a first advantageous embodiment, the cross-brace comprises a first arm and a second arm articulated with respect to one another, each arm comprising a first end articulated with respect to the tray and a second end movable along the bottom, and the return member appears in the form of an elastic connecting the second end of the first arm or the second end of the second arm to the box to move the second end of the first arm closer to the second end of the second arm.

Due to the tension in the elastic, the tray is positioned automatically in its operating position.

By adjusting the tension of the elastic, it is therefore possible to control the force pressing the object against the lid by the tray when the lid closes the stowage volume.

Preferably, the connection between the elastic and the box is located vertically, or practically so, above the first end of the arm to which the elastic is connected.

This favors the traction of the first end on the bottom to push the tray back toward its operating position.

According to a preferred embodiment, the package comprises two elastics each connected to an arm on the one hand and to the bottom of the box on the other hand.

The use of two elastics ensures a synchronized movement of the two arms to push back the tray toward its operating position.

Thus, the risks of the tray forming an abutment inside the package are limited, or even eliminated.

The object to be transported is then correctly retained in the stowage volume between the tray and the lid.

According to a second advantageous embodiment, the cross-brace comprises a first arm and a second arm articulated with respect to one another, each arm comprising a first end articulated with respect to the tray and a second end movable along the bottom, and in that the return member appears in the form of an elastic connecting the second end of the first arm to the second end of the second arm to move them closer to one another.

This allows in particular being able to extract the tray and the return means out of the package when these have no need to be used, or for stowing the package.

Moreover, access to the return means is facilitated in particular for their maintenance.

According to a third advantageous embodiment, the cross-brace comprises a first arm and a second arm articulated with respect to one another, and in that the return member is a torsion spring secured to the first arm and to the second arm, the torsion spring tending to separate the first arm with respect to the second arm.

This allows in particular being able to extract the tray and the return means out of the package when these no longer need to be used or for stowing the package.

Moreover, access to the return means is facilitated, in particular for their maintenance.

In addition, a torsion spring can easily be calibrated based on need and can be embedded in the first arm and the second arm, to protect it for example.

Preferably, the package comprises two torsion springs.

The use of two torsion springs, wisely positioned, allows reducing the risks of kinking the arms during their movement.

Advantageously, the box comprises grooves for guiding the arms in translation with respect to the bottom.

The first arm and the second arm can thus be guided during their movement to push back the tray toward its operating position.

The buttressing of the arms is thus avoided to the benefit of good blocking of the object between the tray and the lid.

Preferably, the box is of the foldable type.

When the package is not used, the box can thus be folded to facilitate its storage and limit the bulk of the package when it is not used.

Other features and advantages of the invention will appear more clearly upon reading the following description of preferred embodiments of the invention, given by way of illustrative and non-limiting examples, and appended drawings in which:

FIG. 1 a perspective view of a package according to the invention, comprising a box inside which a tray is held in an operating position by return means;

Figure 1:
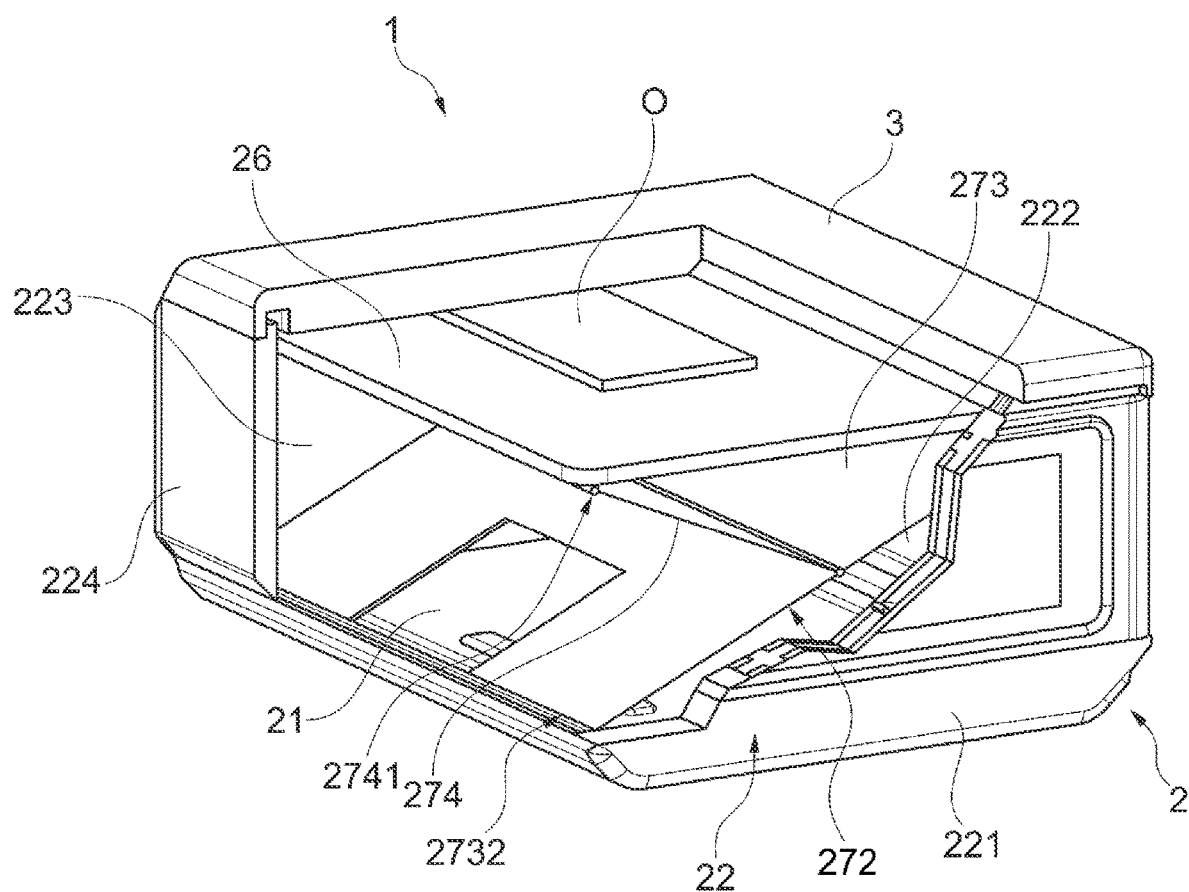

With reference to FIG. 1, a package 1 according to the invention comprises a box 2 defining a stowage volume in which is received at least one object O to be transported, and a lid 3. The lid 3 is intended to close the stowage volume of the box 2.

The box 2 has in particular a bottom 21 and a peripheral rim 22 comprising:
   a first panel 221;
   a second panel 222 opposite to the first panel 221;
   a third panel 223;
   a fourth panel 224 opposite to the third panel 223.

Figure 2:
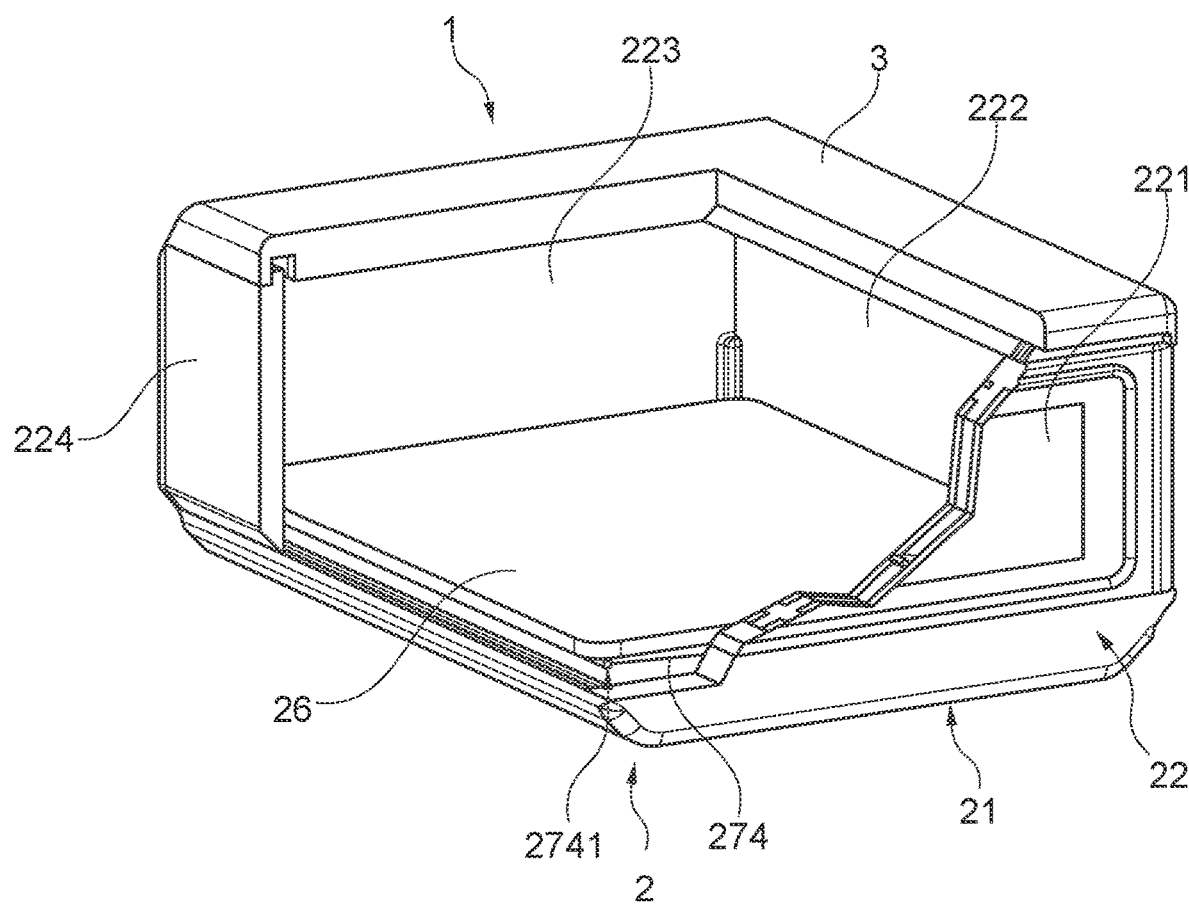
FIG. 2 is a perspective view of a package according to the invention, in which the tray is in a rest position.
Figure 3:
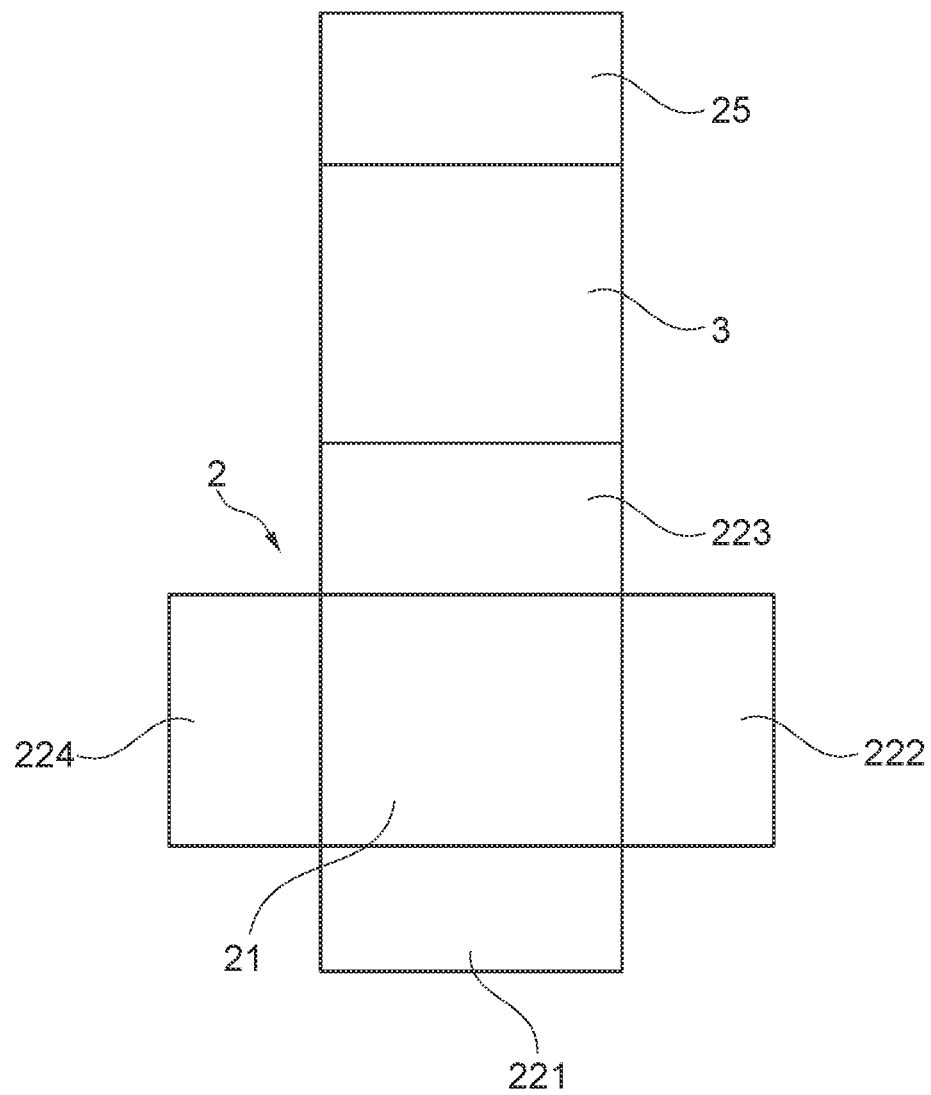
FIG. 3 is a schematic view illustrating the package in an unfolded configuration of the box.

According to a preferred embodiment illustrated in FIGS. 1 to 3, the lid 3 is secured to the peripheral rim 22 of the box 2. More precisely, the lid 3 is mounted articulated on the third panel 223.

With reference to FIG. 3, to retain the lid 3 when it closes the box 2, the lid can comprise a jamb 25 which forms a stand between the lid 3 and the bottom 21.

According to the present embodiments, the box is of the foldable type. Thus, each of the first panel 221, the second panel 222, the third panel 223 and the fourth panel 224 is mounted movable with respect to the bottom 21, meaning that it can adopt:
   a stowage position in which it extends substantially parallel to the bottom 21;
   and an operating position in which it extends substantially parallel to the bottom 21.

In order to hold the panels 221, 222, 223, 224 of the peripheral rim in their operating position, the box 2 comprise retention means not illustrated in the figures.

The retention means can in particular belong to the following groups:
   magnetic;
   applied member;
   deformable;
   with buttressing.

The package 1 can thus be positioned in a storage configuration or in an operating configuration.

In the storage configuration, the panels 221, 222, 223, 224 of the box 2 are in their stowage position and the lid 3 is coplanar with one of the panels 221, 222, 223, 224 of the box 2.

More particularly, the second panel 222 and the fourth panel 224 are positioned in an overlapping relationship with the bottom 21, and the first panel 221 and the third panel 223 are positioned in the continuation of the bottom 21.

In other words, the first panel 221 and the third panel 223 are coplanar with the bottom 21 and the second panel 222 and the fourth panel 224 are above the bottom 21.

The lid 3 is then folded to overlap the third panel 223 and the bottom 21. More precisely, the lid 3 covers the bottom 21 as well as the second panel 222 and the fourth panel 224.

The box 2 also comprises a tray 26 on which is place the object O to be transported, as illustrated in FIG. 1.

The tray 26 is movable in translation with respect to the bottom 21 between two positions, namely:
   a rest position in which the tray 26 is located in proximity to the bottom 21 of the box 2;
   an operating position in which it is separated from the bottom 21 of the box 2 and retains the object O against the lid 3 as explained hereafter.

The tray 26 has an upper surface intended to face the lid 3 when it closes the stowage volume.

This upper surface advantageously bears an anti-skid coating and/or a flexible material favoring the retention of an object on the tray 26.

The anti-skid coating can be a layer of additional material applied to the tray 26.

In this case, the additional material can comprise roughness and/or an adhesive coating such as glue.

Of course, in the case where an adhesive coating is employed, the latter is selected so as to be compatible with the reusable nature of the package 1.

In other words, the adhesive coating must be capable of improving the retention of an object O to be transported in the package 1, while having the capacity to separate itself from the object O when a user desires to extract it from the package 1.

The additional material can in particular be leather or a synthetic material which has characteristics which allow it to adhere to the objects O to be transported contained in the box 2.

However, to retain the reusable nature of the package 1, it is essential that the layer of additional material does not allow retaining dirt such as dust, sand or other elements which might prevent the adhesion of the object O to be transported on the rigid element 26, i.e. the tray.

In the case of a flexible material, foam can be used. This foam must in particular allow itself to be deformed to better mold itself to the contours of the object O to be transported.

To allow its movability and the retention of the object O against the lid 3, the tray 265 is moved by return means 27.

The return means comprise in particular a return member 271.

The return member 271 can then adopt:
   a constrained configuration in which it exerts a first force separating the tray 26 with respect to the bottom 21;
   a released configuration in which it exerts a second force separating the tray 26 with respect to the bottom 21.

The first separating force preferably being greater than the second separating force.

Thus, the return member has a tendency to return to its released configuration, and therefor to position the tray 26 in its operating position.

This tendency of the return member 271 to return to its released configuration thus allows pressing an object O to be transported against the lid 3.

According to the preferred embodiment illustrated by FIGS. 1 to 4, the return means 27 also comprise a cross-brace 272 interleaved between the tray 26 and the bottom 21 of the box 2.

The cross-brace 272 can adopt a flattened position in which it is crushed between the tray 26 and the bottom 21, and a deployed position in which it pushes back the tray 26 with respect to the bottom 21.

The cross-brace 272 comprises a first arm 273 and a second arm 274 articulated with respect to one another in the form of a cross.

More particularly, the first arm 273 and the second arm 274 are articulated around a shaft 275.

The first arm 273 has a first end 2731 by which it is connected to the tray 26, and a second, free end 2732.

Likewise, the second arm 274 has a first end 2741 by which it is connected to the tray 26, and a second, free end 2742.

The first arm 273 and the second arm 274 are preferably mounted in rotation with respect to the tray 26.

The return member 271 is then coupled to the cross-brace to modify an angle A between the two arms 273, 274 of the cross-brace 272.

Figure 5:
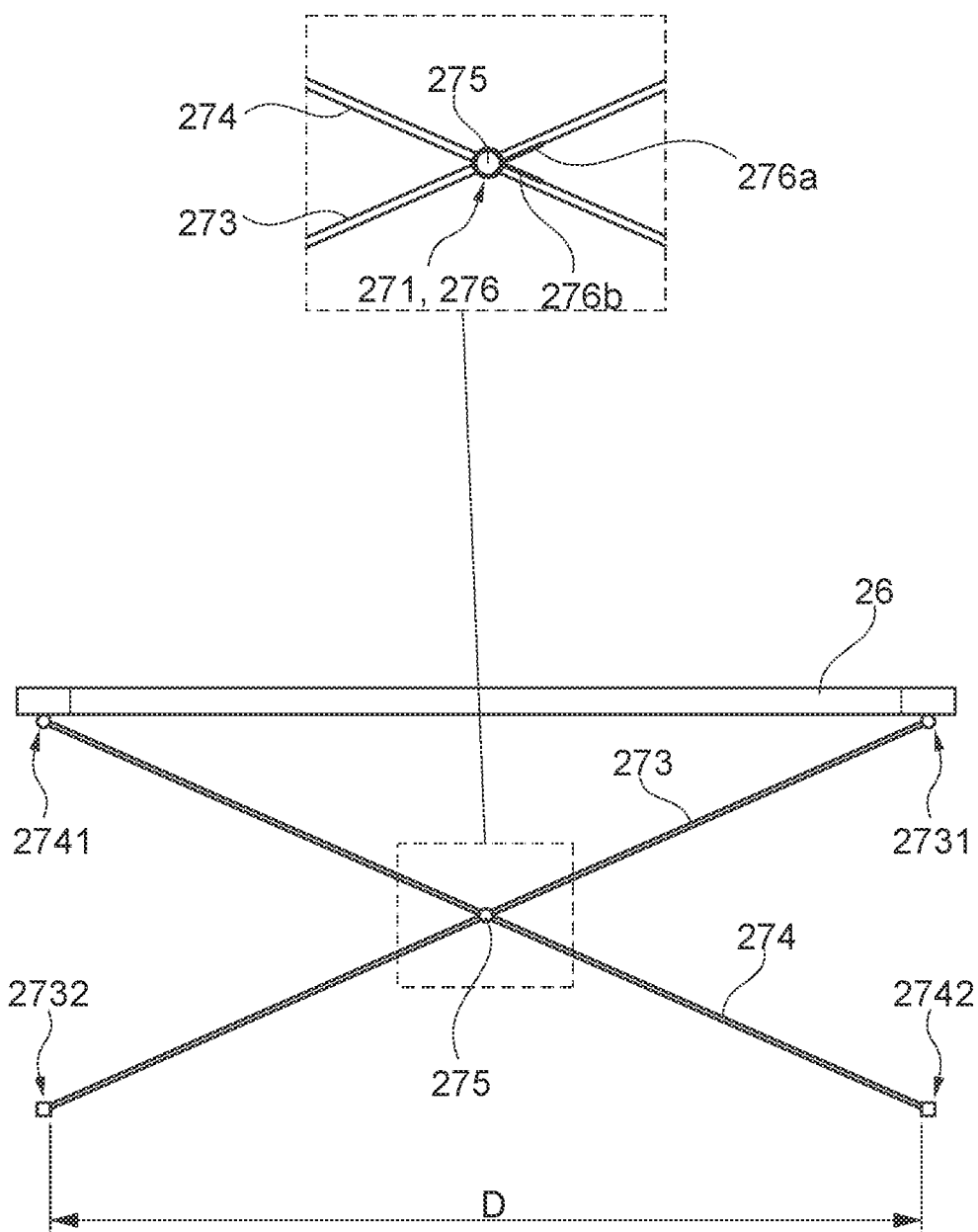
FIG. 5 is a schematic view illustrating the tray and the return means according to a third embodiment.

More precisely, with reference to FIG. 5, an angle A is defined between the first arm 273 and the second arm 274, in the triangle formed between the first arm 273, the second arm 274 and the tray 26.

The passage of the return member 271 from its constrained position to its released position then causes shrinkage of the angle A, and therefore an elevation of the tray 26 with respect to the bottom 21.

On the contrary, when a force is applied to the tray 26, then an angle A increases and the tray 26 is lowered in the direction of the bottom 21.

To allow facilitating the movement of the tray 26, the second end 2731 of the first arm 273 and the second end 2742 of the second arm 274 are mounted in the grooves 28 made in the box 2.

More precisely, the grooves 28 are made in the first panel 221 and the second panel 223 of the peripheral rim 22.

Figure 4:
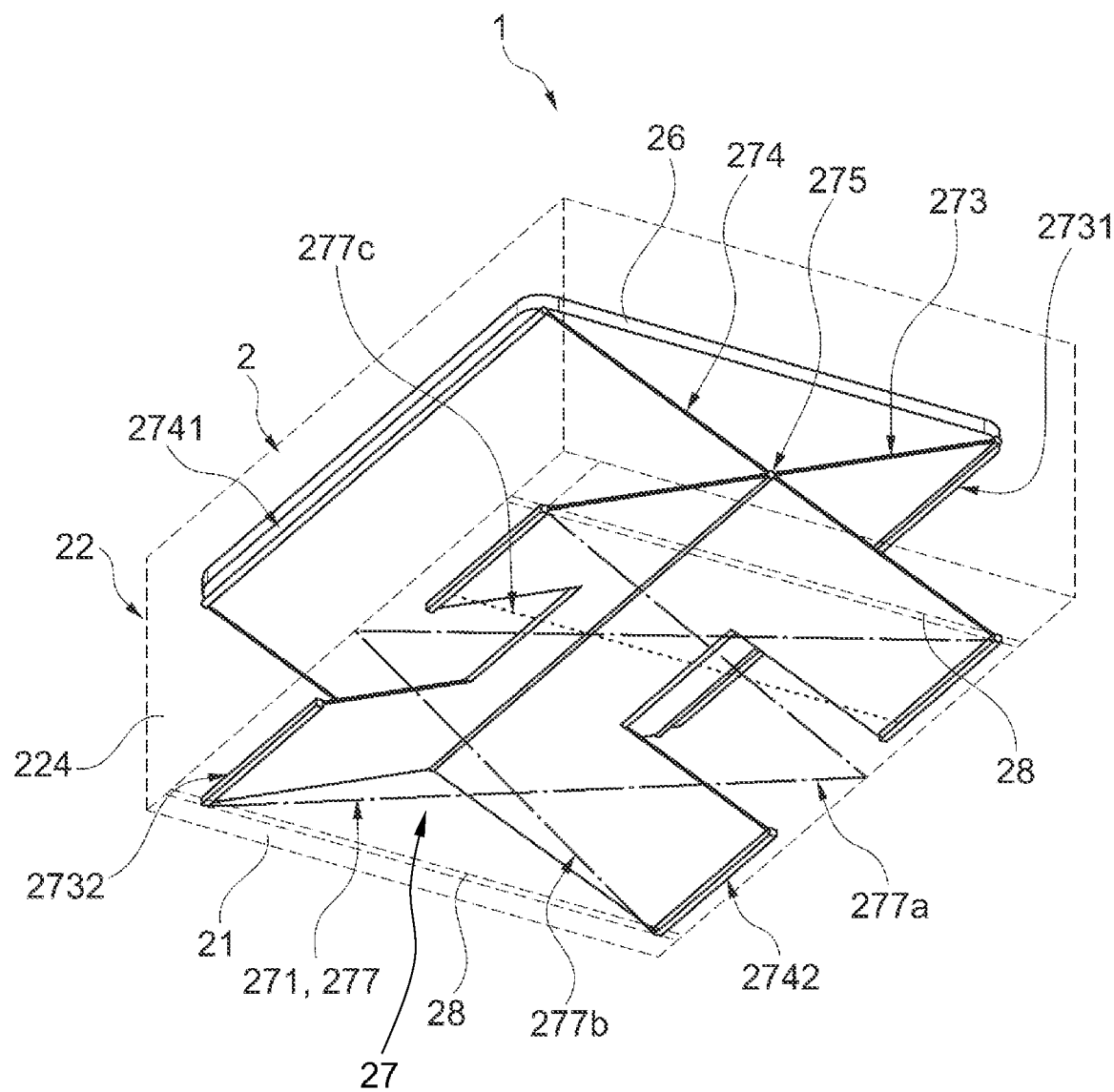
FIG. 4 is a schematic view illustrating the tray and the return means according to a first and a second embodiment.

According to a first and a second embodiment illustrated in FIG. 4, the return member 271 takes the form of an elastic 277.

According to the first embodiment, the elastic 277 is connected on the one hand to the second end 2732 of the first arm 273 or to the second end 2742 of the second arm 274 and, on the other hand, to the box 2.

More precisely, the elastic 277 is connected at each of its ends to the second end 2732 of the first arm 273 or to the second end 2742 of the second arm 274.

The connection between the elastic 277 and the box 2 is provided between the two ends of the elastic 277.

The connection of the elastic 277 to the box 2 can be accomplished either on the peripheral rim 22, or on the bottom 21.

Advantageously, the return means 27 comprise two elastics 277, namely a first elastic 277a and a second elastic 277b.

In this case:
the first elastic 277a is then connected on the one hand to the second end 2732 of the first arm 273 and, on the other hand, to the box 2;
the second elastic 277b is then connected on the one hand to the second end 2742 of the second arm 274 and, on the other hand, to the box 2.

According to the second embodiment, the return member 27 comprises an elastic 277c connecting the first arm 273 and the second arm 274 to one another.

More precisely, the elastic 277c is connected to the second end 2732 of the first arm 273 and to the second end 2742 of the second arm 274.

According to an advantageous embodiment, not illustrated in the figures, the package 1 can comprise several elastics 277c connecting the second end 2732 of the first arm 273 and the second end 2742 of the second arm 274.

According to a third embodiment illustrated in FIG. 5, the return member 271 appears in the form of a torsion spring 276.

The torsion spring 276 is secured to the first arm 273 and to the second arm 274 and tends to separate the first arm 273 with respect to the second arm 274, i.e. reducing the angle A.

More precisely, the torsion spring 276 is mounted around the shaft 275 and comprises a first branch 276a connected to the first arm 273, and a second branch 276b connected to the second arm 274.

Preferably, the return means comprise two torsion springs 276 mounted around the shaft 275.

When the cross-brace 272 is in its flattened position, each torsion spring 276 is then constrained and its two branches 276a, 276b are then close to one another.

By its passage into its released position, each torsion spring 276 allows positioning the cross-brace 272 in its deployed position by separating the first branch 276a with respect to the second branch 276b.

A distance D between the second end 2732 of the first branch 273 and the second end 2742 of the second branch 274 is then narrowed during the passage of the cross-brace 272 from its flattened position to its deployed position.

The second and third embodiments allow being able to completely extract the tray 26 and the return means 27 out of the package 1 when they are not in use because the return means 27 do not join the box 2.

When the cross-brace 272 is in its flattened position, each elastic 277 is then constrained and stretched between the box 2 and the arms 273, 274 to which it is connected, or between the arm 273 and the second arm 274.

By its passage into its released position, each elastic 277 allows positioning the cross-brace 272 in its deployed position by pulling the second end 2732, 3743 of each arm 273, 274 toward each another.

The distance D between the second end 2732 of the first arm 273 and the second end 2742 of the second arm 274 is then narrowed during the passage of the cross-brace 272 from its flattened position to its deployed position.

To allow the transportation of an object O in safety, a package 1 according to the invention can be used.

To this end, the box 2 is formed by positioning panels 221, 222, 223, 224 in their operating position.

In other words, the peripheral rim 22 is formed.

The object O is then inserted into the box 2 and positioned on the tray 26.

When the object O is correctly positioned, the lid 3 can be positioned on the peripheral rim 22 to close the stowage volume.

The return member 271 and the return means 27 then causes the cross-brace 272 to be placed in the deployed position.

This then allows holding the object O blocked between the lid 3 and the tray 26.

Thus, if during its transportation the package 1 is disturbed, the object O remains held between the tray 26 and the lid 3 in complete safety.

The package 1 thus closed can also be dispatched via an ordinary distribution network.

Advantageously, the package 1, in particular its box 2 and its lid 3, can in particular be made of extruded polypropylene like that marketed under the commercial designations Akylux, Akyplein and Akyboard (registered trademarks) of the manufacturer DS SMITH (registered trademark), or of expanded polypropylene, i.e. in the form of a foam, like that sold by the Storopack (registered trademark) company.

The package 1 just described thus allows transporting an object O in complete safety, even if the package is disturbed during its dispatch between two destinations.

In fact, the return means 27 allow positioning the tray 26 in its operating position and thus blocking in movement the object O within the stowage volume, between the lid 3 and the tray 26.

Moreover, in the case of the first embodiment illustrated in FIG. 4, the return means 27 and the tray 26 form a removable assembly which can be extracted with the object O to be transported is sufficiently voluminous to be held in position solely between the lid 3 and the bottom 21 of the box 2.

Moreover, the guiding of the tray 26 due to the groove 28 of the box 2 allows avoiding buttressing of the tray 26 during its movement from its rest position to its operating position.

This allows offering operation of the package 1 over the long term.

The invention claimed is:

1. A logistical shipping reusable package for expedition, transport, and delivery of an object by a shipping company, the package reusable by shipping companies comprising:
   a box having a stowage volume defined by a bottom and a peripheral rim substantially perpendicular to the bottom;
   a lid able to occupy a closed position of the box in which the stowage volume is obturated wherein the lid closes any extraction opening for extracting the object housed in the box to prevent theft of the object transported, and wherein the lid is movable between an open position and the closed position and vice versa;
   a tray housed in the stowage volume and movable with respect to the bottom between a rest position in which it is located in proximity to the bottom and an operating position in which it is separated from the bottom and holds the object blocked against the lid, so as to immobilize the object in the stowage volume;
   means for returning the tray to its operating position, wherein the package is of the foldable type, with a design adapted for multiple shipments including thick walls, the bottom, the peripheral rim and the lid, mainly made from extruded, or expanded polypropylene, to securely transport objects in a safe manner, and wherein the return means comprise:
   a cross-brace movable between a flattened position in which it is crushed between the tray and the bottom, and a deployed position in which it pushes back the tray with respect to the bottom;
   a return member secured to the cross-brace and tending to position the cross-brace in its deployed position from its flattened position.

2. The package according to claim 1, wherein the cross-brace comprises a first arm and a second arm articulated with respect to one another, each arm comprising a first end articulated with respect to the tray and a second end movable along the bottom, and in that the return member appears in the form of at least one elastic connecting the second end of the first arm or the second end of the second arm to the box to move the second end of the first arm closer to the second end of the second arm.

3. The package according to claim 2, wherein the connection between the at least one elastic and the box is located vertically, or practically so, above the first end of the arm to which the at least one elastic is connected.

4. The package according to claim 2, wherein the at least one elastic comprises two elastics each connected to one of the first and second arms on the one hand and to the bottom of the box on the other hand.

5. The package according to claim 1, wherein the cross-brace comprises a first arm and a second arm articulated with respect to one another, each arm comprising a first end articulated with respect to the tray and a second end movable along the bottom, and in that the return member appears in the form of an elastic connecting the second end of the first arm to the second end of the second arm to move them closer to one another.

6. The package according to claim 1, wherein the cross-brace comprises a first arm and a second arm articulated with respect to one another, and in that the return member is at least one torsion spring secured to the first arm and to the second arm, the at least one torsion spring tending to separate the first arm with respect to the second arm.

7. The package according to claim 6, wherein the at least one torsion spring comprises two torsion springs.

8. The package according to claim 6, wherein the box comprises grooves for guiding the first and second arms in translation with respect to the bottom.

* * * * *